(12) United States Patent
Wang

(10) Patent No.: US 9,609,521 B2
(45) Date of Patent: Mar. 28, 2017

(54) MEDICAL BODY AREA NETWORK (MBAN) WITH AUTOMATIC IN-FACILITY SPECTRUM USE ENFORCEMENT

(75) Inventor: Dong Wang, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 919 days.

(21) Appl. No.: 13/637,371

(22) PCT Filed: Mar. 28, 2011

(86) PCT No.: PCT/IB2011/051300
§ 371 (c)(1),
(2), (4) Date: Sep. 26, 2012

(87) PCT Pub. No.: WO2011/128795
PCT Pub. Date: Oct. 20, 2011

(65) Prior Publication Data
US 2013/0023215 A1    Jan. 24, 2013

Related U.S. Application Data

(60) Provisional application No. 61/323,488, filed on Apr. 13, 2010.

(51) Int. Cl.
*H04W 16/14* (2009.01)
*H04W 84/18* (2009.01)
*H04W 48/04* (2009.01)

(52) U.S. Cl.
CPC ............ *H04W 16/14* (2013.01); *H04W 48/04* (2013.01); *H04W 84/18* (2013.01)

(58) Field of Classification Search
CPC ...... H04W 16/14; H04W 48/04; H04W 84/18
See application file for complete search history.

(56) References Cited

U.S. PATENT DOCUMENTS 8,023,898 B2    9/2011    Abedi
8,417,215 B2 *  4/2013    Baldus et al. ............. 455/404.2
(Continued)

FOREIGN PATENT DOCUMENTS

JP    2005064725 A    3/2005

OTHER PUBLICATIONS

Smith, D.; Comments of Philips Healthcare Systems; Amendment of the Commission's Rules to Provide Spectrum for the Operation of Medical Body Area Networks; 2009; ET Docket No. 08-59; pp. 1-67. http://fjallfoss.fcc.gov/ecfs/document/view?id=7020040931.
(Continued)

*Primary Examiner* — Lewis West

(57) ABSTRACT

A medical system comprises: a medical body area network (MB AN) system (10) comprising a plurality of network nodes (12, 14) intercommunicating via short range wireless communication, the MBAN system (10) including a spectrum control sub-module (52) that selects an operating channel or frequency for the short range wireless communication; and a radio frequency identification (RFID) tag (60) disposed with the MBAN system. The spectrum control sub-module selects an operating channel or frequency from a spectrum comprising a combination of (1) a default spectrum and (2) a restricted spectrum authorized for use by the MBAN system conditional upon the MBAN system being within a medical facility as indicated by readings of the RFID tag. The spectrum control sub-module selects an operating channel or frequency from a spectrum comprising only the default spectrum conditional upon the MBAN system not being within the medical facility as indicated by readings of the RFID tag.

13 Claims, 2 Drawing Sheets

(56) References Cited

U.S. PATENT DOCUMENTS

Figure 1:
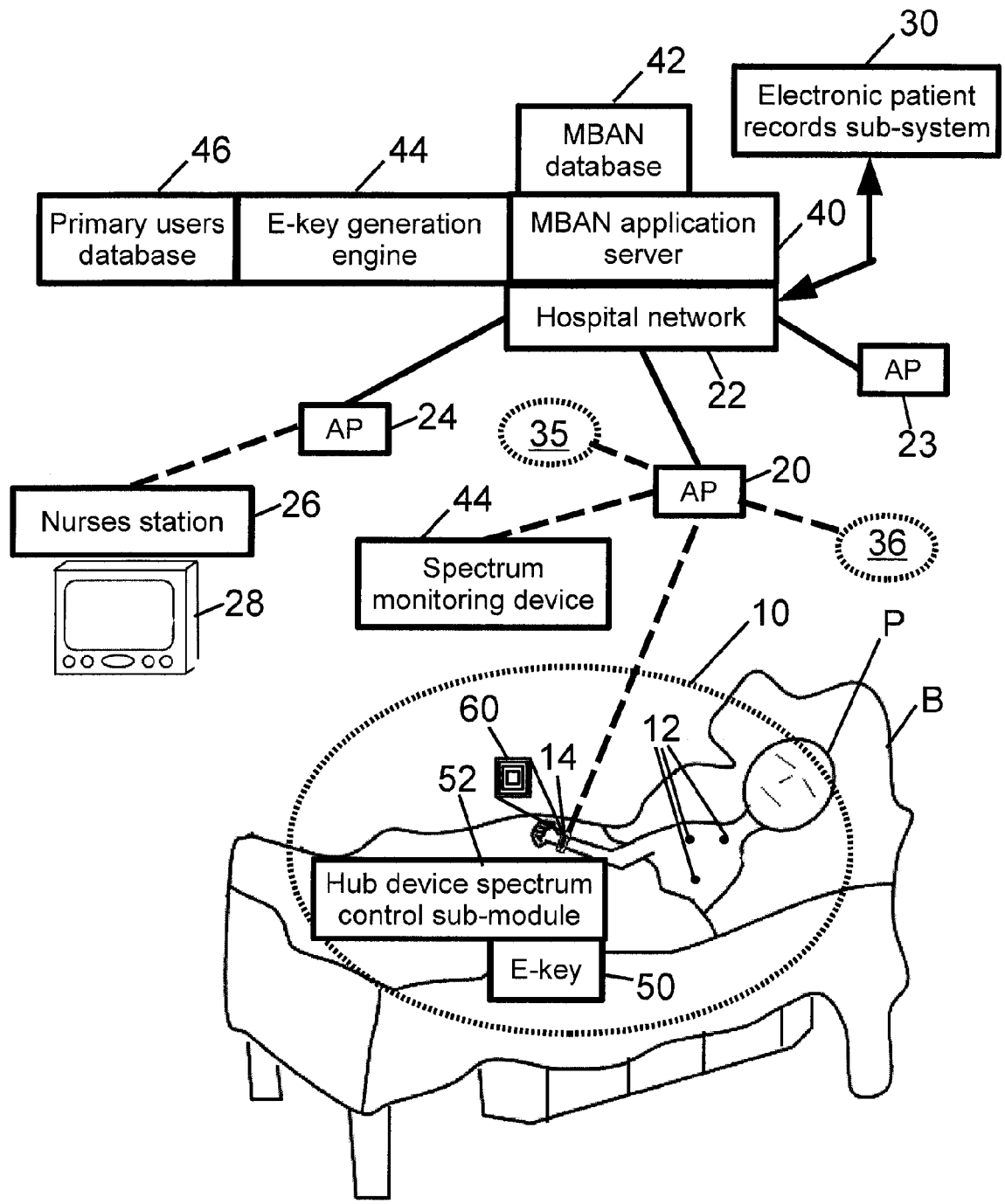

| | | | |
|---|---|---|---|
| 8,442,607 B2* | 5/2013 | Banet et al. | 600/324 |
| 8,483,720 B2* | 7/2013 | Farahani et al. | 455/456.5 |
| 2008/0015903 A1* | 1/2008 | Rodgers | 705/3 |
| 2008/0160984 A1* | 7/2008 | Benes et al. | 455/419 |
| 2008/0183910 A1* | 7/2008 | Natoli et al. | 710/15 |
| 2008/0221399 A1* | 9/2008 | Zhou et al. | 600/301 |
| 2008/0221951 A1* | 9/2008 | Stanforth et al. | 705/7 |
| 2009/0085744 A1 | 4/2009 | Sellin et al. | |
| 2009/0191906 A1* | 7/2009 | Abedi | 455/501 |
| 2009/0267765 A1 | 10/2009 | Greene et al. | |
| 2009/0311960 A1* | 12/2009 | Farahani et al. | 455/41.2 |
| 2012/0071098 A1* | 3/2012 | Chebbo et al. | 455/41.2 |
| 2012/0089370 A1* | 4/2012 | Chebbo et al. | 702/188 |
| 2012/0092155 A1* | 4/2012 | Abedi | 340/539.12 |
| 2013/0017791 A1* | 1/2013 | Wang et al. | 455/41.2 |
| 2013/0316652 A1* | 11/2013 | Wang et al. | 455/41.2 |
| 2014/0065972 A1* | 3/2014 | Wang | 455/41.2 |
| 2014/0342766 A1* | 11/2014 | Wang | 455/509 |

OTHER PUBLICATIONS

Allison, A.; Reply Comments of the Boeing Company; Amendment of the Commission's Rules to Provide Spectrum for the Operation of Medical Body Area Networks; 2009; ET Docket No. 08-59; pp. 1-27. http://fjallfoss.fcc.gov/ecfs/document/view?id=7020244723.

Smith, D.; Philips Healthcare Systems Reply Comments; Amendment of the Commission's Rules to Provide Spectrum for the Operation of Medical Body Area Networks; 2009; ET Docket No. 08-59; pp. 1-50. http://fjallfoss.fcc.gov/ecfs/document/view?id=7020244837.

* cited by examiner

MEDICAL BODY AREA NETWORK (MBAN) WITH AUTOMATIC IN-FACILITY SPECTRUM USE ENFORCEMENT

CROSS REFERENCE TO RELATED APPLICATIONS

This application claims the benefit of U.S. provisional application Ser. No. 61/323,488 filed Apr. 13, 2010, which is incorporated herein by reference.

This application claims the benefit of U.S. Provisional Application No. 61/323,488 filed Apr. 13, 2010. U.S. Provisional Application No. 61/323,488 filed Apr. 13, 2010 is incorporated herein by reference in its entirety.

The following relates to the medical monitoring arts, wireless communication arts, and related arts.

A medical body area network (MBAN) replaces the tangle of cables tethering hospital patients to their bedside monitoring units with wireless connections. This provides low-cost wireless patient monitoring (PM) without the inconvenience and safety hazards posed by wired connections, which can trip medical personnel or can become detached so as to lose medical data. In the MBAN approach, multiple low cost sensors are attached at different locations on or around a patient, and these sensors take readings of patient physiological information such as patient temperature, pulse, blood glucose level, electrocardiographic (ECG) data, or so forth. The sensors are coordinated by at least one proximate hub or gateway device to form the MBAN. The hub or gateway device communicates with the sensors using embedded short-range wireless communication radios, for example conforming with an IEEE 802.15.4 (Zigbee) short-range wireless communication protocol. Information collected by the sensors is transmitted to the hub or gateway device through the short-range wireless communication of the MBAN, thus eliminating the need for cables. The hub or gateway device communicates the collected patient data to a central patient monitoring (PM) station via a wired or wireless longer-range link for centralized processing, display and storage. The longer-range network may, for example, include wired Ethernet and/or a wireless protocol such as Wi-Fi or some proprietary wireless network protocol. The PM station may, for example, include an electronic patient record database, display devices located at a nurse's station or elsewhere in the medical facility, or so forth.

MBAN monitoring acquires patient physiological parameters. Depending upon the type of parameter and the state of the patient, the acquired data may range from important (for example, in the case of monitoring of a healthy patient undergoing a fitness regimen) to life-critical (for example, in the case of a critically ill patient in an intensive care unit). In general, there is a strict reliability requirement on the MBAN wireless links due to the medical content of the data.

As MBAN systems become more common in a hospital or other medical facility, spectrum usage increases. This can be accommodated by allocating more spectrum to MBAN applications. However, the allocated spectrum should be of "high quality" as appropriate for transmission of important medical data. Such spectrum is highly coveted. For example, both MBAN usage and aeronautical mobile telemetry (AMT) desire to use the 2360-2390 MHz spectrum (hereinafter referred to as the "MBAN spectrum). In the United States, it has been proposed to allocate 2360-2400 MHz for MBAN on a secondary basis, with AMT being the primary user for the 2360-2390 MHz spectrum. In such a scheme, the secondary MBAN users would be required by government regulation to protect the primary AMT users in the 2360-2390 MHz spectrum space and to accept possible interference from those primary users in that spectrum space.

In order to achieve co-existence between primary users and secondary users, some restrictions (or spectrum regulation rulings) are placed on use of the shared spectrum by secondary users. By way of example, one possible restriction is to limit the secondary use of a spectrum to usage only within authorized (indoor) facilities and to prohibit out-of-door usage by the secondary services. Another possible restriction is to implement exclusion zones, which are regions surrounding AMT sites that are defined to ensure separation distance between MBAN systems and AMT receivers. In order to avoid interference to an AMT receiver, MBAN operations within part or the entire 2360-2390 MHz spectrum are proposed to be prohibited in such exclusion zones, even if the MBAN operation is limited to a healthcare facility.

To facilitate enhanced usage of MBAN systems at hospitals and other medical facilities, it has been proposed to allocate the wider 2360-2400 MHz band (the "MBAN spectrum") specifically for MBAN services. In the United States, the Federal Communications Commission (FCC) adopted an MBAN notice of proposed rulemaking (NPRM) in June 2009. Considering the wide bandwidth, interference-free and good propagation properties of the MBAN spectrum, it would be advantageous for MBAN applications to use the MBAN spectrum to provide medical-grade connectivity if the MBAN spectrum is allocated for MBAN usage.

However, the proposed allocation of the MBAN spectrum for MBAN usage is on a secondary basis, which means MBAN usage would be required by government regulation to protect all the primary users in the MBAN spectrum and to accept possible interference from those primary users. The current primary users in the MBAN spectrum include Amateur Radio (2390-2400 MHz), Aeronautical Mobile Telemetry (AMT) (2360-2395 MHz; note that currently only 2360-2390 MHz is in use by AMT); and Radio Astronomy (2370-2390 MHz).

In order to protect the primary users, especially AMT sites, it has been proposed in the United States to limit MBAN operations in the 2360-2390 MHz band to healthcare facilities only. Under this proposed regulatory scheme, MBAN devices are only allowed to operate in the 2360-2390 MHz when they are located within a healthcare facility—if an MBAN system moves outside, it is required under this proposed scheme to switch to a new channel outside the 2360-2390 MHz band. Moreover, exclusion zones, which are regions surrounding AMT sites, are proposed to be defined to ensure separation distance between MBAN systems and AMT receivers. In order to avoid interference to an AMT receiver, MBAN operations within part or the entire 2360-2390 MHz spectrum are proposed to be prohibited in such exclusion zones, even if the MBAN operation is limited to a healthcare facility.

Compliance with such a regulatory scheme is expected to be based on manual operations, and should be strict. However, strict compliance is difficult to ensure by manual approaches, at least because (1) MBAN spectrum usage is not visually perceptible; (2) some MBAN systems are mobile; and (3) the manual compliance is distributed amongst numerous human personnel, such as physicians, nurses, hospital staff, and so forth.

In a contemplated manual approach, when an MBAN system is prescribed by a health care professional to monitor a patient in a healthcare facility, a nurse or other health care staff will manually enable the hub device to use part or the entire 2360-2390 MHz spectrum based on the FCC regulation. Later, if the patient is going to move outside the healthcare facility, for example, due to discharge from hospital, a healthcare staff member will manually disable the hub device to use the 2360-2390 MHz spectrum. The manually enable/disable operations could be implemented by manually entering a passcode on the hub device or by connecting the hub device with a specific device (for example, plug a USB key on the hub device) and a program running on the hub device or the specific device could automatically enable/disable the 2360-2390 MHz spectrum access of the hub device.

However, such manual administration method employs substantial staff intervention and significantly reduces workflow efficiency in the hospital. Manual administration also is not flexible, and may fail to deal effectively with mobile AMT sites (for example, a temporal exclusion zone might be defined from time to time to protect mobile AMT sites or vehicles).

The following provides new and improved apparatuses and methods which overcome the above-referenced problems and others.

In accordance with one disclosed aspect, a method comprises: operating a medical body area network (MBAN) system comprising a plurality of network nodes intercommunicating via short range wireless communication at a selected operating channel or frequency; selecting the operating channel or frequency from an extended spectrum comprising a default spectrum and an additional spectrum conditional upon the MBAN system being located inside a medical facility as indicated by a radio frequency identification (RFID) tag associated with the MBAN system; and selecting the operating channel or frequency from the default spectrum but not the additional spectrum conditional upon the MBAN system being located outside the medical facility as indicated by the RFID tag associated with the MBAN system.

In accordance with another disclosed aspect, a medical system comprises: a medical body area network (MBAN) system comprising a plurality of network nodes intercommunicating via short range wireless communication, the MBAN system including a spectrum control sub-module that selects an operating channel or frequency for the short range wireless communication; and a radio frequency identification (RFID) tag disposed with the MBAN system. The spectrum control sub-module of the MBAN system selects an operating channel or frequency from a spectrum comprising: a combination of (1) a default spectrum and (2) a restricted spectrum authorized for use by the MBAN system conditional upon the MBAN system being within a medical facility as indicated by readings of the RFID tag; and only the default spectrum conditional upon the MBAN system not being within the medical facility as indicated by readings of the RFID tag.

In accordance with another disclosed aspect, a method comprises: providing an active medical body area network (MBAN) system comprising a plurality of network nodes intercommunicating via short range wireless communication at a selected operating channel or frequency that is in a restricted spectrum; detecting the active MBAN system moving outside of a medical facility; and responsive to the detecting, changing the operating channel or frequency to a different operating channel or frequency that is not in the restricted spectrum.

One advantage resides in safe co-existence of secondary users and primary users in a shared spectrum space.

Another advantage resides in more efficient spectrum usage.

Another advantage resides in principled usage of short-range communication spectrum by primary and secondary users while maintaining the strict compliance of secondary users respective to access rights of the primary users.

Further advantages will be apparent to those of ordinary skill in the art upon reading and understanding the following detailed description.

FIG. 1 diagrammatically illustrates a medical body area network (MBAN) system in the context of a medical environment including a central frequency agility sub-system as disclosed herein.

Figure 2:
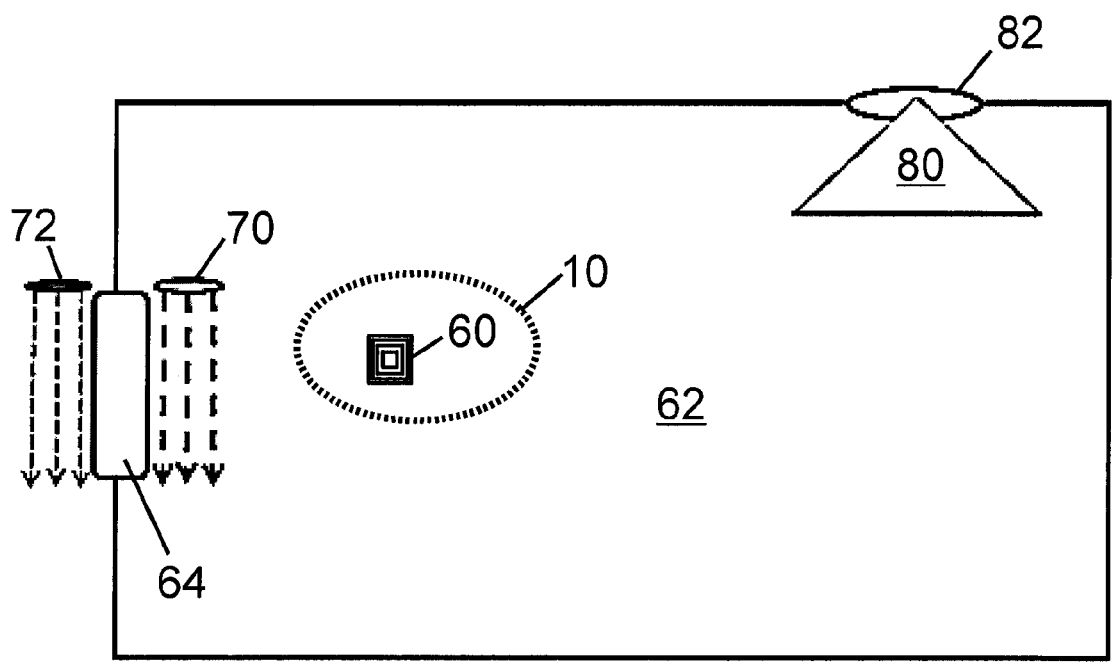

FIG. 2 diagrammatically shows a medical facility and radio frequency identifier (RFID) readers arranged to detect and disambiguate entry or exit of an MBAN to or from the medical facility based on readings of an RFID tag disposed with the MBAN.

With reference to FIG. 1, a medical body area network (MBAN) 10 includes a plurality of network nodes 12, 14. At least one of the network nodes 12, 14 serves as a hub device 14. The network nodes 12 communicate with the hub device 14 via a short-range wireless communication protocol. The MBAN 10 is also sometimes referred to in the relevant literature by other equivalent terms, such as a body area network (BAN), a body sensor network (BSN), a personal area network (PAN), a mobile ad hoc network (MANET), or so forth—the term medical body area network (MBAN) 10 is to be understood as encompassing these various alternative terms.

The illustrative MBAN 10 includes four illustrative network nodes 12, 14 including the hub device 14; however, the number of network nodes can be one, two, three, four, five, six, or more, and moreover the number of network nodes may in some embodiments increase or decrease in an ad hoc fashion as sensor nodes are added or removed from the network to add or remove medical monitoring capability. The network nodes 12 are typically sensor nodes that acquire physiological parameters such as heart rate, respiration rate, electrocardiographic (ECG) data, or so forth; however, it is also contemplated for one or more of the network nodes to perform other functions such as controlled delivery of a therapeutic drug via a skin patch or intravenous connection, performing cardiac pacemaking functionality, or so forth. A single network node may perform one or more functions. The illustrative network nodes 12 are disposed on the exterior of an associated patient P; however, more generally the network nodes may be disposed on the patient, or in the patient (for example, a network node may take the form of an implanted device), or proximate to the patient within the communication range of the short-range communication protocol (for example, a network node may take the form of a device mounted on an intravenous infusion pump (not shown) mounted on a pole that is kept near the patient, and in this case the monitored patient data may include information such as the intravenous fluid flow rate). It is sometimes desirable for the network nodes to be made as small as practicable to promote patient comfort, and to be of low complexity to enhance reliability—accordingly, such network nodes 12 are typically low-power devices (to keep the battery or other electrical power supply small) and may have limited on-board data storage or data buffering. As a consequence, the network nodes 12 should be in continuous or nearly continuous short-range wireless communication with the hub device 14 in order to expeditiously convey acquired patient data to the hub device 14 without overflowing the data buffer.

The hub device 14 (also sometimes referred to in the relevant literature by other equivalent terms, such as "gateway device" or "hub node") coordinates operation of the MBAN 10 by collecting (via the Zigbee, Bluetooth™, or other short-range wireless communication protocol) patient data acquired by the sensors of the network nodes 12 and transmitting the collected data away from the MBAN 10 via a longer range communication protocol. The short-range wireless communication protocol preferably has a relatively short operational range of a few tens of meters, a few meters, or less, and in some embodiments suitably employs an IEEE 802.15.4 (Zigbee) short-range wireless communication protocol or a variant thereof, or a Bluetooth™ short-range wireless communication protocol or a variant thereof. Both Bluetooth™ and Zigbee operate in a frequency spectrum of around 2.4-2.5 GHz. Although Bluetooth™ and Zigbee are suitable embodiments for the short-range wireless communication, other short-range communication protocols, including proprietary communication protocols, are also contemplated. Moreover, the short-range wireless communication can operate at other frequencies besides the 2.4-2.5 GHz range, such as ranges in the hundreds of megahertz, gigahertz, tens-of-gigahertz, or other ranges. The short-range communication protocol should have a sufficient range for the hub device 14 to communicate reliably with all network nodes 12 of the MBAN system 10. In FIG. 1, this short-range wireless communication range is diagrammatically indicated by the dotted oval used to delineate the MBAN system 10. The short-range wireless communication is typically two-way, so that the network nodes 12 can communicate information (e.g., patient data, network node status, or so forth) to the hub device 14; and the hub device 14 can communicate information (e.g., commands, control data in the case of a therapeutic network node, or so forth) to the network nodes 12. The illustrative hub device 14 is a wrist-mounted device; however, the hub device can be otherwise mounted to the patient, for example as a necklace device, adhesively glued device, cellular telephone, or so forth. It is also contemplated for the hub device to be mounted elsewhere proximate to the patent, such as being integrated with an intravenous infusion pump (not shown) mounted on a pole that is kept near the patient, or as a set-top box.

The hub device 14 also includes a transceiver (not shown) providing the longer-range communication capability to communicate data off the MBAN system 10. In the illustrative example of FIG. 1, the hub device 14 wirelessly communicates with an access point (AP) 20 of a hospital network 22. The illustrative AP 20 is a wireless access point that communicates wirelessly with the hub device 14. In the illustrative embodiment the hospital network 22 also includes additional access points, such as illustrative access points AP 23 and AP 24, that are distributed throughout the hospital or other medical facility. To provide further illustration, a nurses' station 26 is diagrammatically indicated, which is in wireless communication with the AP 24 and includes a display monitor 28 that may, for example, be used to display medical data for the patient P that are acquired by the MBAN system 10 and communicated to the nurses' station 26 via the path comprising the AP 20, the hospital network 22, and the AP 24. By way of another illustrative example, the hospital network 22 may provide access with an electronic patient records sub-system 30 in which is stored medical data for the patient P that are acquired by the MBAN system 10 and communicated to the electronic patient records sub-system 30 via the path comprising the AP 20 and the hospital network 22. The illustrative longer-range communication between the hub device 14 and the AP 20 is wireless, as diagrammatically indicated in FIG. 1 by a dashed connecting line. (Similarly, wireless communication between the AP 24 and the nurses' station 26 is indicated by a dashed connecting line). In some suitable embodiments, the longer-range wireless communication is suitably a WiFi communication link conforming with an IEEE 802.11 wireless communication protocol or a variant thereof. However, other wireless communication protocols can be used for the longer-range communication, such as another type of wireless medical telemetry system (WMTS). Moreover, the longer range communication can be a wired communication such as a wired Ethernet link (in which case the hub device includes at least one cable providing the wired longer range communication link).

The longer range communication is longer range as compared with the short-range communication between the network nodes 12 and the hub device 14. For example, while the short-range communication range may be of order a few tens of centimeters, a few meters, or at most perhaps a few tens of meters, the longer range communication typically encompasses a substantial portion of the hospital or other medical facility through the use of multiple access points 20, 23, 24 or, equivalently, multiple Ethernet jacks distributed throughout the hospital, in the case of a wired longer-range communication. Elsewhere in this application, the longer range communication 20, 22, 23, 24 is referred to as a backhaul link.

The longer-range communication, if wireless, requires more power than the short-range communication—accordingly, the hub device 14 includes a battery or other power source sufficient to operate the longer-range communication transceiver. Alternatively, the hub device 14 may include a wired electrical power connection. The hub device 14 also typically includes sufficient on-board storage so that it can buffer a substantial amount of patient data in the event that communication with the AP 20 is interrupted for some time interval. In the illustrative case of wireless longer-range communication, it is also to be understood that if the patient P moves out of range of the AP 20 and into range of another AP (for example, AP 23 or AP 24) then the IEEE 802.11 or other wireless communication protocol employed by the hospital network 22 (including its wireless access points 20, 23, 24) provides for the wireless link to shift from AP 20 to the newly proximate AP. In this regard, although the patient P is illustrated as lying in a bed B, more generally it is contemplated for the patient P to be ambulatory and to variously move into and out of range of the various access points 20, 23, 24. As the patient P thus moves, the MBAN 10 including the network nodes 12 and the hub device 14 moves together with the patient P.

In the MBAN 10, the network nodes 12 communicate with the hub device 14 via the short-range wireless communication. However, it is also contemplated for various pairs or groups of the network nodes 12 to also intercommunicate directly (that is, without using the hub device 14 as an intermediary) via the short-range wireless communication. This may be useful, for example, to coordinate the activities of two or more network nodes in time. Moreover, the hub device 14 may provide additional functionality—for example, the hub device 14 may also be a network node that includes one or more sensors for measuring physiological parameters. Still further, while the single hub device 14 is illustrated, it is contemplated for the coordinating functionality (e.g. data collection from the network nodes 12 and offloading of the collected data via the longer range wireless communication) to be embodied by two or more network nodes that cooperatively perform the coordinating tasks.

In illustrative FIG. 1, only the single MBAN system 10 is illustrated in detail. However, it will be appreciated that more generally the hospital or other medical facility includes a plurality of patients, each having his or her own MBAN system. This is diagrammatically shown in FIG. 1 by two additional MBAN systems 35, 36 also communicating with the AP 20 via the longer range wireless communication. More generally, the number of MBAN systems may be, by way of some illustrative examples: two, three, four, five, ten, twenty, or more. Indeed, it is even contemplated for a single patient to have two or more different, independently operating MBAN systems (not illustrated).

With continuing reference to FIG. 1, an MBAN application server 40 communicates with the MBAN systems 10, 35, 36 via the longer range communication or backhaul link 20, 22, 23, 24 to perform various application tasks. By way of illustrative example, the MBAN application server 40 may perform tasks such as coordinating data transfer from the hub device 14 to the electronic patient records subsystem 30 for storage, coordinating data transfer from the hub device 14 to the display monitor 28 for display, and so forth. Toward this end, the MBAN application server 40 maintains an MBAN database 42 containing relevant information about each active MBAN system 10, 35, 36.

To provide spectrum usage control, the MBAN application server 40 further includes or has access to an electronic key (E-key) generation engine 44. The E-key generation device generates an electronic key (E-key) that specifies what spectrum is available for MBAN usage. Various limitations can exist on the available spectrum, such as limitations imposed by primary users where MBAN communications are a secondary usage; limitations on spectrum based on region, national country, or other geographic locale; or so forth. The limitations on available spectrum may vary as a function of time, and such variation may be periodic or aperiodic.

The E-key generation engine 44 is suitably embodied by a computer, network server, or other digital processing device. The MBAN application server 44 is also suitably embodied by a computer, network server, or other digital processing device, which may be the same as or different from the digital processing device embodying the E-key generation engine 44. In some embodiments the E-key generation engine 44 is embodied as an application program executing on the MBAN application server 40.

By way of illustrative example, in the illustrative embodiment the 2360-2400 MHz spectrum is referred to in this illustrative example as the "MBAN spectrum". However, the portion from 2360-2390 MHz is allocated for MBAN usage on a secondary basis, with aeronautical mobile telemetry (AMT) users being the primary users for the 2360-2390 MHz spectrum. In the illustrative example, the limitations on MBAN usage in the 2360-2390 MHz spectrum space is implemented by regulations including: (1) limiting MBAN usage in this spectrum space to MBAN systems operating indoors in designated medical facilities and (2) defining stationary "exclusion zones" around AMT sites—no MBAN usage of the portion of the 2360-2390 MHz band that is currently in use by AMT users is allowed at any time in any such stationary exclusion zone; and (3) defining temporary exclusion zones corresponding to mobile or intermittent AMT use—no MBAN usage of the portion of the 2360-2390 MHz band that is currently in use by AMT users is allowed in such a temporary exclusion zone during the time it is in place. A consequence of (3) is that usage of part of all of the 2360-2390 MHz spectrum space in a designated medical facility may be temporarily barred during the time when a temporary exclusion zone encompassing the medical facility is in place.

The foregoing example is merely illustrative—in general, limitations may be placed on various spectrum spaces at various times and various locations as dictated by governing regulations promulgated by relevant government regulatory agencies, hospital policies, or so forth.

To implement spectrum limitations, the E-key generation engine 44 receives information on spectrum limitations. In the illustrative example, the spectrum limitations are imposed by AMT users, and accordingly the spectrum limitations (or information from which spectrum limitations can be determined) are provided to the E-key generation engine 44 in the form of a primary users (e.g., AMT) database 46. For each AMT site, some information suitably contained in the AMT Database 46 includes: site location; contact information for the AMT site; frequency range (that is, spectrum in use) by the AMT site; AMT deployment type (that is, fixed or mobile site), usage time period (relevant for a mobile site); and site receiver characteristics (e.g. antenna gain, height, or so forth). In some embodiments, the content of the AMT database 46 is accessible only by the E-key generation engine 44, but not by other persons or entities having access to the hospital network 22 or the MBAN application server 40. Such access limitation provides access control and security for confidential AMT information.

Additionally, the E-key generation engine 44 obtains information about the medical facility and/or the MBAN systems. In a suitable embodiment, the information is stored in the MBAN database 42 and is accessible by the E-key generation engine 44 either directly or via the MBAN application server 40. Some medical facility-related information suitably contained in the MBAN Database 42 includes: hospital information such as physical address, location, contact information; building height (which may be relevant for estimating the range of radio frequency interference due to MBAN operation); environment (e.g., urban or rural); number of currently active MBAN systems; number of MBAN systems authorized for concurrent operation, or so forth. The MBAN database 42 also suitably stores information about each MBAN system, such as: equipment type; manufacturer; deployment type (e.g., fixed or mobile); transmission (TX) Power, for example measured by an effective radiated power (ERP) metric; and the E-key (if any) issued to each MBAN system.

Based on the content of the AMT database 46 and the MBAN database 42, the E-key generation engine 44 determines exclusion zones (both stationary and mobile) and hence determines whether the hospital or other medical facility is located within an exclusion zone (or determines when the hospital or other medical facility is or will be located within an exclusion zone, in the case of a mobile or temporary exclusion zone). The geographical extent of an exclusion zone can be calculated based on electromagnetic simulation (or an approximation thereof, such as a assuming a circular exclusion zone centered on the AMT site and having a specified radius), field measurements, or a combination thereof. Alternatively, the geographical extent of the exclusion zone can be pre-calculated information that is stored in the AMT database 46. Based on this information, the E-key generation engine 44 generates an electronic key (E-key) indicative of the spectrum space usable for MBAN systems at the hospital or other medical facility.

In an alternative approach, the AMT user can determine which portion (if any) of the shared spectrum is to be usable by MBAN systems of the hospital or other medical facility, and the AMT database 46 can then store this spectrum information for retrieval by the E-key generation engine 44.

The E-key generated by the E-key generation engine 44 is suitably distributed to the various MBAN systems 10, 35, 36 by the MBAN application server 40 via the longer range communication or backhaul link 20, 22, 23, 24, and a copy of the E-key 50 is stored at the hub device 14 of each MBAN system 10. Optionally, the MBAN application server 40 stores information about the E-key assigned to each MBAN system 10, 35, 36. If the MBAN is not connected with a backhaul, then the E-key can be loaded manually, or using a portable USB drive, or so forth.

In some embodiments, different E-keys can be assigned to different MBAN systems within the same medical facility. For example, larger MBAN systems or MBAN systems including network nodes having stronger transmitters may be assigned a more restrictive E-key (or no E-key at all) since the larger and/or stronger-transmitting MBAN system may be more likely to interfere with a neighboring AMT site. Different E-keys may also be assigned to different MBAN systems based on their location within the medical facility. For example, a more restrictive E-key (or no E-key at all) may be assigned to MBAN systems located at elevated positions where they are more likely to produce problematic interference for AMT sites.

At the MBAN system, a spectrum control sub-module 52 of the hub device 14 (suitably embodied by software or firmware running on a digital processor of the hub device 14) assigns a channel or frequency for the short-range communication of the MBAN system 10. In one suitable approach, the spectrum control sub-module 52 of the hub device 14 assigns a channel or frequency in a default spectrum space (e.g., 2390-2400 MHz in the illustrative example), and only assigns a channel or frequency in the shared or otherwise restricted spectrum space (e.g., 2360-2390 MHz in the illustrative example) if the E-key 50 authorizes usage of this restricted spectrum space. In this way, the default operation does not impinge on any restricted spectrum, and the additional restricted spectrum is only utilized (or considered for utilization) if the E-key 50 affirmatively authorizes usage of the additional restricted spectrum.

The generated E-key can take various forms. In one suitable approach, the E-key is a single binary value, for which one binary value (e.g., "1") indicates the spectrum space 2360-2390 MHz is available for MBAN use and the other binary value (e.g., "0") indicates the spectrum space 2360-2390 MHz is not available for MBAN use. Alternatively, the E-key can specify the spectrum space using any suitable encoding. This may be appropriate in embodiments for which different portions of the spectrum may be variously available or unavailable for MBAN use, such that a single binary value is insufficient to convey the MBAN-usable spectrum.

Optionally, the E-key also includes an expiration time, which may be specified either in absolute time (i.e., a date certain on which the E-key expires) or in relative time (e.g., the E-key is valid for 24 hours, or 10 minutes, et cetera from the time of receipt at the MBAN). Specifying an expiration time advantageously ensures that an MBAN system will not use shared or otherwise restricted spectrum authorized by the E-key indefinitely (for example, after the patient wearing the MBAN system is discharged from the hospital).

Optionally, the E-key also includes a healthcare facility identification. In such embodiments, the E-key authorizes use of the shared or otherwise restricted spectrum within the identified healthcare facility. It is contemplated in such embodiments for a single MBAN system to have two or more E-keys for two or more corresponding medical facilities, so that different usable spectrums may be specified for the different facilities by the different E-keys. This may be useful, for example, if the patient transfers between different medical facilities for different treatments. In a suitable operating approach, the MBAN system determines in which facility it is currently located (and, hence, which E-key to use) based on which backhaul link with which it can connect.

In embodiments in which the E-key 50 has an expiration time, that expiration time can be selected to provide various functionality. For example, in some embodiments in which the longer range communication or backhaul link 20, 22, 23, 24, is robust and reliable and fast, the expiration time may be set to be short, e.g. of order a few minutes, or a few seconds, or less. In such embodiments, the expiration time advantageously ensures that a mobile MBAN system quickly (i.e., within a few minutes, or a few seconds, or less) vacates the restricted spectrum as soon as the MBAN system moves outside of range of the longer range communication or backhaul link 20, 22, 23, 24 (for example, because the patient leaves the medical facility).

In other embodiments the expiration time is longer, which reduces transmission load on the longer range communication or backhaul link 20, 22, 23, 24. In such embodiments other mechanisms can be employed to limit spectrum usage when the patient leaves the medical facility. For example, the MBAN system can switch to an unrestricted frequency or channel (e.g., in the 2390-2400 MHz range in the illustrative example) if the signal from the longer range communication or backhaul link 20, 22, 23, 24 is lost or becomes weak (thus possibly indicating that the MBAN system is moving away from the medical facility). In the case of controlled movement, such as patient discharge or patient transportation outside the hospital for an off-site medical procedure, the E-key may be invalidated automatically by the MBAN application server 40 (in cases in which the hub device has an operative backhaul link) or the E-key may be invalidated manually (in cases in which the hub device does not have an operative backhaul link).

One circumstance that can arise is that a given patient with an active (and mobile) MBAN may move outside of the hospital. This is of concern if the regulatory scheme only allows MBAN devices to operate in the restricted band (e.g., 2360-2390 MHz in the illustrative example) when they are located within a healthcare facility. Under such a regulatory scheme, if an MBAN system moves outside, it is required to switch to a new channel outside the restricted band (e.g., to the band 2390-2400 MHz in the illustrative example). If the expiration time of the E-key is only a few minutes, or a few seconds, or less, then this may be sufficient protection against uncontrolled patient movement. In such embodiments with fast E-key expiration, if the patient moves outside the service area of the hospital network 22, then the hub device will not be able to get E-key refresh commands from MBAN application server 40 and so once the E-key expires (i.e., in a few minutes, or a few seconds, or less), use of the 2360-2390 MHz spectrum is automatically disabled.

As another approach, if the patient only has sensor devices on-body, so that the hub device does not move outside with the patient, then the MBAN sensor devices would not be able to hear the hub device, then they would keep quiet.

As yet another approach, a radio frequency identification (RFID) tag 60 (shown diagrammatically in enlargement in diagrammatic FIG. 1, but suitably, by way of example, mounted on or in the hub device 14) disposed on the patient, on or in the hub device 14, or otherwise proximate to the (mobile) MBAN can be used in conjunction with RFID readers at doors of the medical facility to detect when the patient P enters or leaves the medical facility.

If a network node 12 (other than the hub node 14) that is currently operating at a restricted channel or frequency loses communication with the hub node 14 then the network node suitably stops communicating so as to ensure that it does not generate interference for primary users. Communication can be reestablished by the hub device 14, or alternatively the network node 12 can attempt to reestablish communication with the hub device 14 using an unrestricted frequency or channel (e.g., in the range 2390-2400 MHz in the illustrative example).

With continuing reference to FIG. 1 and with further reference to FIG. 2, an approach for using the RFID tag 60 mounted on or with the illustrative MBAN 10 is described. In this case, the MBAN 10 is assumed to be mobile, for example because the patient P is recovering and is now allowed to move about within a medical facility 62. In particular, the MBAN 10 can move from inside the medical facility 62 to outside, or vice versa, via a door or entrance/exit 64. The RFID tag 60 is mounted to the hub device 60, or to the associated patient P, or is otherwise arranged to move with the MBAN 60. To utilize the RFID tag 60 for enforcing the requirement of the restricted spectrum (which again is 2360-2390 MHz in the illustrative example), the MBAN table or database 42 maintained by the MBAN application server 40 stores the network address and also the RFID tag identifier of each prescribed MBAN network currently registered to the healthcare facility (e.g., the tag identifier for RFID tag 60 for the illustrative MBAN 10). Thus, the MBAN table or database 42 includes the following three fields: (1) a hub device RFID tag identifier; (2) hub device healthcare facility information technology (IT) network address; and (3) in-facility status (In-facility, Out-facility, Prohibited-area). Optionally, the following further field is stored: backhaul connection status (Active or Broken). (Note, the healthcare facility IT network is also referred to herein as the longer range communication or backhaul link, and in the illustrative example of FIG. 1 includes the hospital network 22 and access points 20, 23, 24.)

When the MBAN 10 is prescribed and activated by a healthcare professional within a healthcare facility, the hub device 14 attempts to establish a backhaul link to connect to the healthcare facility IT network first. Once its backhaul link is set up, the hub device 14 obtains a unique healthcare network IT network address. Then, the hub device 14 reports the tag identifier for its RFID tag 60 and the healthcare facility IT network address to the MBAN application server 40. The MBAN application server 40 then updates the MBAN table or database 42 by adding a new record for the MBAN 10 and sets its backhaul connection status to "Active" and its in-facility status to "In-facility".

After that, the MBAN application server 40 sends a command to the hub device 14 to update the spectrum availability parameters (MBAN spectrum availability update command) in the hub device. Such command includes the information including whether any part of the restricted 2360-2390 MHz spectrum is available for MBAN operations and where the available spectrum is if any. In a suitable embodiment, these operations are performed using the E-key approach already described, wherein the E-key 50 provides the information regarding availability of the restricted 2360-2390 MHz spectrum. The hub device 14 updates its spectrum availability parameters accordingly and selects one MBAN channel from the available spectrum to initiate an MBAN. The sensor devices join the MBAN and start operations on the selected MBAN channel.

The MBAN application server 40 periodically sends MBAN spectrum availability update commands to all the MBANs including the MBAN 10 in the MBAN table or database 42 that have backhaul connection status as "Active". Once the hub device 14 of the MBAN 10 receives an MBAN spectrum availability update command from the MBAN application server 40, it updates its spectrum availability parameters and checks whether its currently used MBAN channel is in the available spectrum. If yes, no further operation is needed. If no, the hub device 14 selects a new MBAN channel within the currently available spectrum and initiate an MBAN channel switch operation to move the MBAN 10 to the selected new channel. Again, in a suitable embodiment these operations are performed as occasional E-key update operations as already described.

If the backhaul link of the MBAN 10 is broken, which usually happens when patients move outside the service area of a healthcare facility (e.g. a mobile patient wanders far away from the healthcare facility 62), then the hub device 14 will not be able to get MBAN spectrum availability update commands from the MBAN application server 40. If a hub device 14 has not received any MBAN spectrum availability update commands from the MBAN application server for a predefined period (such as the expiration time of the E-key 50), it will update its spectrum availability parameters with its default value (e.g., 2390-2400 MHz in the illustrative embodiment) and indicate that the restricted spectrum (e.g., 2360-2390 MHz) is not available. Then the hub device 14 will check if the currently used channel is in the 2360-2390 MHz spectrum and if yes, it will move out such spectrum by channel switch operation. When the backhaul link of the MBAN 10 is recovered after being broken, which usually happens when the patient P moves back to the service area of a healthcare facility 62, then the hub device 14 is again able to get MBAN spectrum availability update commands again from the MBAN application server 40. Once the MBAN hub device 14 receives such command, it updates its local spectrum availability parameters accordingly and initiate channel switch operations as needed. Again, in a suitable embodiment this corresponds to the already-described response to expiration of the E-key without receiving a new E-key.

As previously noted, this response to E-key expiration could prevent the MBAN 10 from operating in the restricted 2360-2390 MHz spectrum when it moves outside of the healthcare facility 62 even without action involving the RFID tag 60. However, if the expiration time is long, e.g. of order minutes, hours or longer, then this may result in operation in the restricted spectrum with the MBAN 10 outside of the healthcare facility 62 for an unacceptably long interval before the E-key expiration terminates the restricted spectrum operation. Moreover, if the healthcare facility (e.g., hospital) network 22 is a wireless network, such as Wi-Fi, then it is likely that the coverage area of the network 22 will also include some outdoor regions that are close to the facility 62, such as balcony and the areas just in front of the doors, where MBAN hub devices could still receive spectrum availability update commands. Therefore, reliance upon E-key expiration alone cannot guarantee compliance with the regulation barring operation of the MBAN on the restricted spectrum when outside of the medical facility 62.

To provide a faster and more certain termination of operation when the MBAN 10 moves outside of the healthcare facility 62, the RFID tag 60 is used. At each healthcare facility entrance (such as the illustrative door or entrance/exit 64), two RFID readers 70, 72 are installed to detect RFID tags. The RFID readers 70, 72 are close to door 64, with the first RFID reader 70 located just within the building (also referred to herein as as the in-door RFID reader 70), and the second RFID reader 72 located just outside the building (also referred to herein as the out-door RFID reader 72). More generally, the first RFID reader 70 is located relatively more inwardly of the medical facility 62 and the second RFID reader 72 is located relatively more outwardly of the medical facility 62.

Both RFID readers 70, 72 are connected to the healthcare facility IT network and can communicate with the MBAN application server 40. When the patient P with the on-body MBAN 10 leaves or enters the medical facility 62 through the door 64, both RFID readers 70, 72 detect the RFID tag 60 attached on the hub device 14 (or otherwise moving with the MBAN 10) and obtains a reading of the RFID tag 60 (e.g., reads the identifier for the RFID tag 60). The order of detection by the RFID readers 70, 72 can be used to determine whether the MBAN 10 has entered or left the medical facility 62. Considering first the MBAN 10 moving outside of the medical facility 62, the detection order is in-door reader 70 first and out-door reader later 72. On the other hand, when the MBAN 10 moves from outside back into the medical facility 62, the detection order is out-door reader 72 first and in-door reader 70 later.

Both RFID readers 70, 72 suitably report the detected RFID tag identifiers together with a time stamp to the MBAN application server 40. At the MBAN application server 40, all the reported RFID detection events for the MBAN 10 (which is registered in the MBAN table or database 42) are sorted based on their time stamps. If the latest reported RFID detection event is from a out-door RFID reader such as the illustrative out-door RFID reader 72, then the MBAN application server 40 updates the MBAN table 42 by setting the in-facility status of that MBAN as "Out-facility" and sends an MBAN spectrum availability update command with the default value "the 2360-2390 MHz not available and the 2390-2400 MHz available" to the MBAN 10. Again, in the illustrative example this can be done by sending an updated E-key 50 to the MBAN 10. Once the hub device 14 of the MBAN 10 gets such command, it checks whether the currently used channel is in the 2360-2390 MHz spectrum and if yes, it will move out of the restricted spectrum by a channel switch operation.

In analogous fashion, if the latest reported RFID detection event is from an indoor RFID reader such as the illustrative indoor RFID reader 70, then the MBAN application server 40 updates the MBAN table 42 by setting the in-facility status of the MBAN 10 as "In-facility" and sends an MBAN spectrum availability update command (e.g., updated E-key) with the information about the current available spectrum in the 2360-2400 MHz spectrum to the MBAN 10.

There could also be some special areas, such as an illustrative area 80 indicated in FIG. 2, in which the MBAN operations in the restricted 2360-2390 MHz spectrum are not desired. For example, one may want to avoid MBAN operations close to a window that faces toward an AMT receiver site in order to protect AMT services provided by that site. In such a case, a prohibited-area RFID reader 82 is suitably installed to cover the area 80 in which MBAN operations in the 2360-2390 MHz spectrum is prohibited (also referred to herein as a prohibited area 80). If a patient moves into the prohibited area 80, the prohibited-area RFID reader 82 will detect the RFID tag 60 of the hub device 14 or otherwise disposed with the MBAN 10 of the patient P. The RFID reader 82 suitably reports the detected RFID tag identifier together with a time stamp to the MBAN application server 40. At the MBAN application server 40, all the reported RFID detection events of the MBAN 10 (which, again, is registered in the MBAN table 42) are sorted based on their time stamps. If the latest reported RFID detection event is from a prohibited-area RFID reader such as the RFID reader 82, then the MBAN application server 40 updates the MBAN table 42 by setting the in-facility status of the MBAN 10 as "Prohibited-area" and sends an MBAN spectrum availability update command (e.g., updated E-key) with the default value "the 2360-2390 MHz not available and the 2390-2400 MHz available" to the MBAN 10. Once the MBAN hub device 14 gets such command, it will update its local spectrum availability parameters and check whether the currently used channel is in the 2360-2390 MHz spectrum and if yes, it will move out of the restricted spectrum by a channel switch operation.

If a patient later moves out of the prohibited area 80, the prohibited-area RFID reader 82 will no longer be able to detect the RFID tag 60 of the hub device 14 on the patient P. The RFID reader 82 will report the detected MBAN change (moving-out) to the MBAN application server 40. At the MBAN application server 40, all the reported RFID detection events of the MBAN 10 are sorted based on their time stamps. If the latest reported RFID detection event is from a prohibited-area RFID reader and it is "moving-out" event, then the MBAN application server 40 updates the MBAN table 42 by changing the in-facility status of the MBAN 10 from "Prohibited-area" to "In-facility" and will send an MBAN spectrum availability update command (e.g., updated E-key) with the information about the current available spectrum in the 2360-2400 MHz spectrum to that MBAN. Once the MBAN hub device gets such command, it will update its local spectrum availability parameters.

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

The invention claimed is:

1. A method comprising:
operating a medical body area network (MBAN) system comprising a plurality of network nodes intercommunicating via short-range wireless communication at a selected operating channel or frequency;
selecting the operating channel or frequency from an extended spectrum comprising a default spectrum and an additional spectrum conditional upon the MBAN system being located inside a medical facility as indicated by a radio frequency identification (RFID) tag associated with the MBAN system; and
selecting the operating channel or frequency from the default spectrum but not the additional spectrum conditional upon the MBAN system being located outside the medical facility as indicated by the RFID tag associated with the MBAN system; and
determining the MBAN system is located outside the medical facility based on (i) a first RFID reader located relatively more inwardly of the medical facility detecting the RFID tag followed by (ii) a second RFID reader located relatively more outwardly of the medical facility detecting the RFID tag.

2. The method of claim 1, further comprising:
determining the MBAN system is located inside the medical facility based on (i) a second RFID reader located relatively more outwardly of the medical facility detecting the RFID tag followed by (ii) a first RFID reader located relatively more inwardly of the medical facility detecting the RFID tag.

3. The method of claim 1, wherein each patient entrance/exit is provided a first RFID reader located relatively more inwardly of the medical facility and with a second RFID reader located relatively more outwardly of the medical facility, and the method further comprises:
determining the MBAN system is located outside the medical facility based on a last RFID reader detecting the RFID tag being one of the second RFID readers.

4. The method of claim 1, wherein each patient entrance/exit is provided a first RFID reader located relatively more inwardly of the medical facility and with a second RFID reader located relatively more outwardly of the medical facility, and the method further comprises:
determining the MBAN system is located inside the medical facility based on a last RFID reader detecting the RFID tag being one of the first RFID readers.

5. A medical system comprising:
a medical body area network (MBAN) system comprising a plurality of network nodes intercommunicating via short-range wireless communication, the MBAN system including a spectrum control sub-module that selects an operating channel or frequency for the short-range wireless communication; and
a radio frequency identification (RFID) tag disposed with the MBAN system;
an in-door RFID reader located inside a door of a medical facility; and
an out-door RFID reader located outside the door of the medical facility;
wherein the spectrum control sub-module of the MBAN system selects an operating channel or frequency from a spectrum comprising:
a combination of (1) a default spectrum and (2) a restricted spectrum authorized for use by the MBAN system conditional upon the MBAN system being within the medical facility as indicated by the last reading of the RFID tag being acquired by the in-door RFID reader; and
only the default spectrum conditional upon the MBAN system not being within the medical facility as indicated by readings of the RFID tag the last reading of the RFID tag being acquired by the out-door RFID reader.

6. The medical system of claim 5, wherein the spectrum control sub-module selects the operating channel or frequency based upon an electronic key indicating whether the MBAN system is authorized to use the restricted spectrum, and the medical system further comprises:
an MBAN application server issuing the electronic key to the MBAN system with the electronic key configured to authorize the MEAN system to use the restricted spectrum or not based at least in part on whether the MEAN system is within the medical facility as indicated by readings of the RFID tag.

7. The medical system of claim 6, further comprising:
a longer range communication or backhaul link via which the MBAN application server issues the electronic key to the MBAN system.

8. The medical system of claim 7, wherein the MBAN system includes:
a hub device; and
a plurality of network nodes communicating with the hub device via short-range wireless communication, the hub device also communicating via the longer range communication or backhaul link to receive the electronic key from the MBAN application server, the hub device embodying the spectrum control sub-module).

9. The medical system of claim 6, further comprising wherein:
the MBAN application server configures the electronic key to authorize the MBAN system to use the restricted spectrum if the last reading of the RFID tag was acquired by the in-door RFID reader and configures the electronic key to not authorize the MBAN system to use the restricted spectrum if the last reading of the RFID tag was acquired by the out-door RFID reader.

10. The medical system of claim 5, wherein:
the MBAN system includes a plurality of network nodes communicating with a hub device via short-range wireless communication,
wherein the RFID tag is disposed on or in the hub device.

11. The medical system of claim 5, wherein the spectrum control sub-module of the MBAN system selects an operating channel or frequency from a spectrum comprising:
a combination of (1) a default spectrum and (2) a restricted spectrum authorized for use by the MBAN system conditional upon the MBAN system being within a medical facility and not within a prohibited area of the medical facility as indicated by readings of the RFID tag; and
only the default spectrum conditional upon the MBAN system not being within the medical facility or being within a prohibited area of the medical facility as indicated by readings of the RFID tag.

12. A method comprising:
providing an active medical body area network (MBAN) system comprising a plurality of network nodes intercommunicating via short-range wireless communication at a selected operating channel or frequency that is in a restricted spectrum;
detecting the active MBAN system moving outside of a medical facility; and
responsive to the detecting, changing the operating channel or frequency to a different operating channel or frequency that is not in the restricted spectrum;
wherein the detecting of the RFID tag moving outside of the medical facility comprises detecting the RFID tag using a first RFID reader located relatively more inwardly of the medical facility followed by detecting the RFID tag using a second RFID reader located relatively more outwardly of the medical facility.

13. The method of claim 12, wherein the detecting comprises detecting a radio frequency identification (RFID) tag disposed with the MBAN system moving outside of the medical facility.

* * * * *